United States Patent
Pappu et al.

(10) Patent No.: US 11,972,254 B2
(45) Date of Patent: Apr. 30, 2024

(54) UTILIZING A MACHINE LEARNING MODEL TO TRANSFORM A LEGACY APPLICATION TO A LOW-CODE/NO-CODE APPLICATION

(71) Applicant: Accenture Global Solutions Limited, Dublin (IE)

(72) Inventors: Rajesh Pappu, Bangalore (IN); Surender Subramanian, Bangalore (IN); Jeevak Balasubramaniam, Bangalore (IN); Vijay Baskaran, Chennai (IN)

(73) Assignee: Accenture Global Solutions Limited, Dublin (IE)

(*) Notice: Subject to any disclaimer, the term of this patent is extended or adjusted under 35 U.S.C. 154(b) by 107 days.

(21) Appl. No.: 17/812,025

(22) Filed: Jul. 12, 2022

(65) Prior Publication Data
US 2024/0020113 A1  Jan. 18, 2024

(51) Int. Cl.
*G06F 8/40* (2018.01)
*G06F 8/38* (2018.01)
*G06F 8/41* (2018.01)
*G06F 8/71* (2018.01)
*G06N 20/00* (2019.01)

(52) U.S. Cl.
CPC ............ *G06F 8/71* (2013.01); *G06F 8/38* (2013.01); *G06F 8/433* (2013.01); *G06N 20/00* (2019.01)

(58) Field of Classification Search
CPC ............................................. G06F 8/40
See application file for complete search history.

(56) References Cited

U.S. PATENT DOCUMENTS

| | | | | |
|---|---|---|---|---|
| 2008/0022264 | A1* | 1/2008 | Macklem | G06F 8/34 717/136 |
| 2016/0093232 | A1* | 3/2016 | Chong | G06F 8/436 434/118 |
| 2022/0067320 | A1* | 3/2022 | Zakharov | G06F 16/953 |
| 2023/0064194 | A1* | 3/2023 | Kwon | G06F 16/1734 |

\* cited by examiner

*Primary Examiner* — Jae U Jeon
(74) *Attorney, Agent, or Firm* — Harrity & Harrity, LLP

(57) ABSTRACT

A device may receive an application for transforming legacy applications into low-code/no-code applications to be managed by a low-code/no-code platform, and may execute the application for a legacy application of the legacy applications. The device may process the legacy application, with a machine learning model, to identify one or more components of the legacy application to be managed by the low-code/no-code platform, and may transform the one or more components into one or more transformed components to be managed by the low-code/no-code platform. The device may implement the one or more transformed components in the legacy application to generate a transformed legacy application, and may perform one or more actions based on the transformed legacy application.

20 Claims, 9 Drawing Sheets

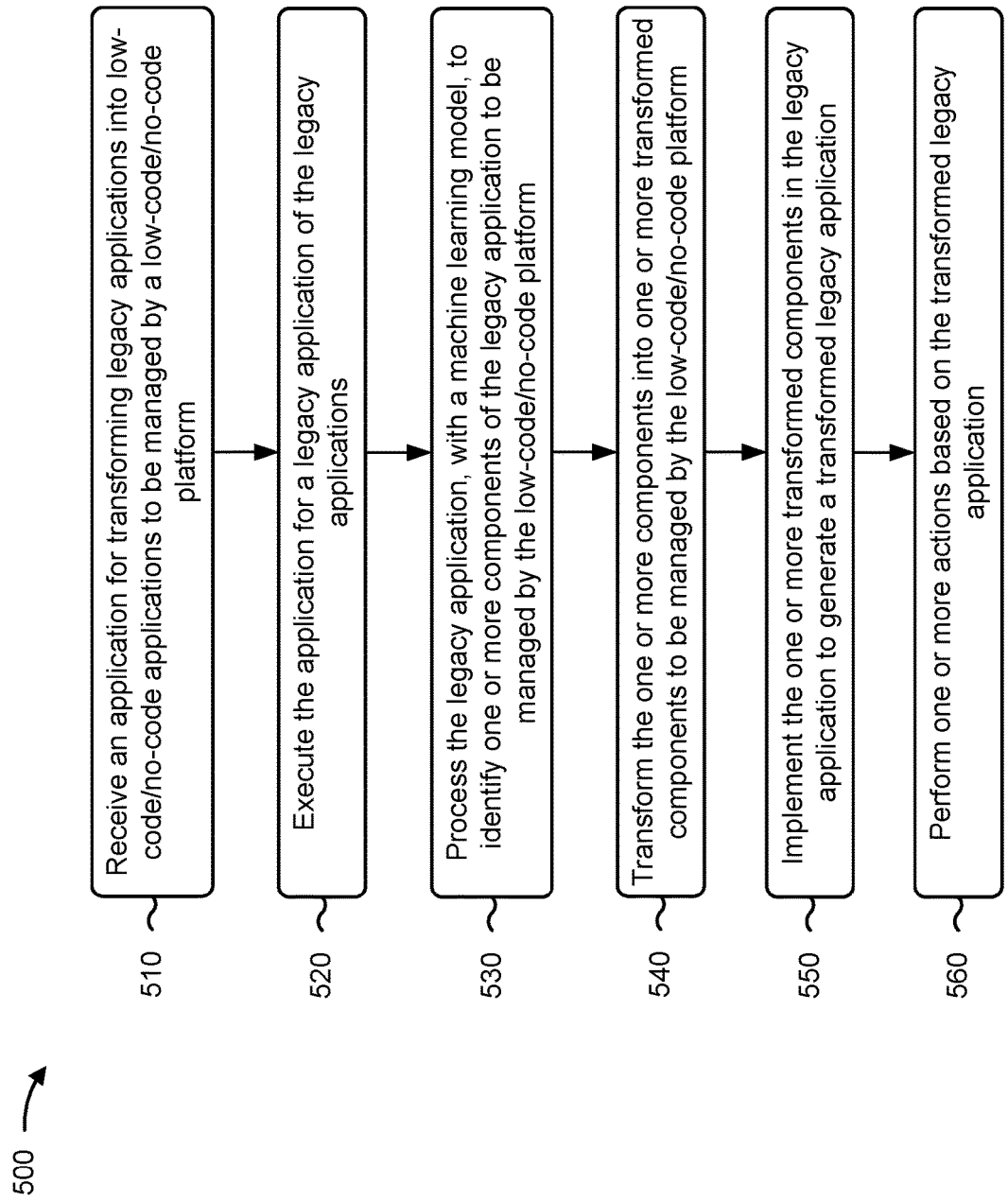

UTILIZING A MACHINE LEARNING MODEL TO TRANSFORM A LEGACY APPLICATION TO A LOW-CODE/NO-CODE APPLICATION

BACKGROUND

A low-code/no-code platform is a type of visual software development environment that allows enterprise developers and citizen developers to drag and drop application components, connect the application components together, create applications with the application components, and/or the like. A low-code/no-code platform may enable professional developers to quickly create applications by relieving the developers of the need to write code line by line. A low-code/no-code platform may enable others who are not software developers to create and test applications.

SUMMARY

Some implementations described herein relate to a method. The method may include receiving an application for transforming legacy applications into low-code/no-code applications to be managed by a low-code/no-code platform, and executing the application for a legacy application of the legacy applications. The method may include processing the legacy application, with a machine learning model, to identify one or more components of the legacy application to be managed by the low-code/no-code platform, and transforming the one or more components into one or more transformed components to be managed by the low-code/no-code platform. The method may include implementing the one or more transformed components in the legacy application to generate a transformed legacy application, and performing one or more actions based on the transformed legacy application.

Some implementations described herein relate to a device. The device may include one or more memories and one or more processors coupled to the one or more memories. The one or more processors may be configured to execute a plugin application for transforming legacy applications into low-code/no-code applications to be managed by a low-code/no-code platform, and process the legacy application, with a machine learning model, to identify one or more components of the legacy application to be managed by the low-code/no-code platform. The one or more processors may be configured to transform the one or more components into one or more transformed components to be managed by the low-code/no-code platform, and implement the one or more transformed components in the legacy application to generate a transformed legacy application. The one or more processors may be configured to perform one or more actions based on the transformed legacy application.

Some implementations described herein relate to a non-transitory computer-readable medium that stores a set of instructions for a device. The set of instructions, when executed by one or more processors of the device, may cause the device to receive an application for transforming legacy applications into low-code/no-code applications to be managed by a low-code/no-code platform, and execute the application for a legacy application of the legacy applications. The set of instructions, when executed by one or more processors of the device, may cause the device to process the legacy application, with a machine learning model, based on execution of the application, to identify one or more components of the legacy application to be managed by the low-code/no-code platform, and transform, based on execution of the application, the one or more components into one or more transformed components to be managed by the low-code/no-code platform. The set of instructions, when executed by one or more processors of the device, may cause the device to implement, based on execution of the application, the one or more transformed components in the legacy application to generate a transformed legacy application, and perform one or more actions based on the transformed legacy application.

BRIEF DESCRIPTION OF THE DRAWINGS

FIG. 5 is a flowchart of an example process for utilizing a machine learning model to transform a legacy application to a low-code/no-code application.

DETAILED DESCRIPTION

Figure 1A:
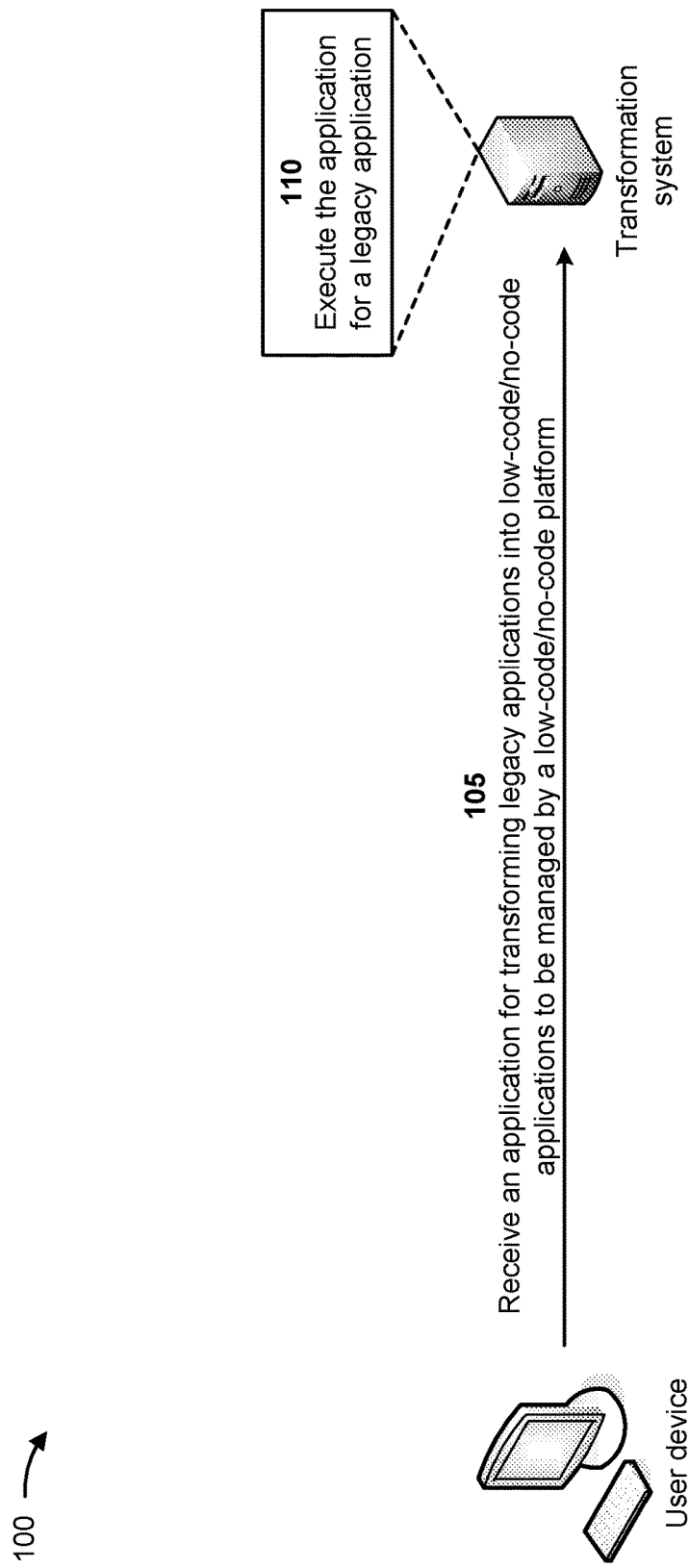
FIGS. 1A-1E are diagrams of an example implementation described herein.

The following detailed description of example implementations refers to the accompanying drawings. The same reference numbers in different drawings may identify the same or similar elements.

There are a number of low-code/no-code platforms available that allow end users and non-developers to make modifications to existing applications that are developed on such platforms. This convenience is only available for applications created from scratch on the low-code/no-code platforms. However, there are thousands of legacy applications created using legacy technologies that require developers to make simple changes, which may be time consuming and expensive. Current techniques require migration of legacy applications to a low-code/no-code platform. Therefore, current techniques for modifying legacy applications and/or migrating legacy applications to a low-code/no-code platform consume computing resources (e.g., processing resources, memory resources, communication resources, and/or the like), networking resources, and/or the like associated with utilizing developers to make simple changes to legacy applications, spending time and money on migration of legacy applications to a low-code/no-code platform, scheduling developers to make changes to legacy applications, and/or the like.

Some implementations described herein relate to a transformation system that utilizes a machine learning model to transform a legacy application to a low-code/no-code application. For example, the transformation system may receive an application for transforming legacy applications into low-code/no-code applications to be managed by a low-code/no-code platform, and may execute the application for a legacy application of the legacy applications. The transformation system may process the legacy application, with a machine learning model, to identify one or more components of the legacy application to be managed by the low-code/no-code platform, and may transform the one or more components into one or more transformed components to be managed by the low-code/no-code platform. The transformation system may implement the one or more transformed components in the legacy application to generate a transformed legacy application, and may perform one or more actions based on the transformed legacy application.

In this way, the transformation system utilizes a machine learning model to transform a legacy application to a low-code/no-code application. The transformation system may utilize a module (e.g., a plugin application) that, when executed by the transformation system, transforms legacy applications into applications that may be managed by a low-code/no-code platform. Non-developer users may easily manipulate the transformed legacy applications, with migration of the legacy applications to a low-code/no-code platform. This, in turn, conserves computing resources, networking resources, and/or the like that would otherwise have been consumed in utilizing developers to make simple changes to legacy applications, spending time and money on migration of legacy applications to a low-code/no-code platform, scheduling developers to make changes to legacy applications, and/or the like.

FIGS. 1A-1E are diagrams of an example 100 associated with utilizing a machine learning model to transform a legacy application to a low-code/no-code application. As shown in FIGS. 1A-1E, example 100 includes a transformation system associated with a user device. The transformation system may include a system that utilizes a machine learning model to transform a legacy application to a low-code/no-code application. Further details of the transformation system and the user device are provided elsewhere herein.

As shown in FIG. 1A, and by reference number 105, the transformation system may receive an application for transforming legacy applications into low-code/no-code applications to be managed by a low-code/no-code platform. For example, the transformation system may receive the application, for transforming legacy applications into low-code/no-code applications to be managed by the low-code/no-code platform, from the user device. In some implementations, the application may be provided by the transformation system and may not be received from the user device. In some implementations, the application may include a plugin application that may be implemented (e.g., executed) by the legacy applications to be transformed into the low-code/no-code applications, an application provided by the transformation system, an application to be compiled and deployed with the legacy applications to be transformed into the low-code/no-code applications, and/or the like.

As further shown in FIG. 1A, and by reference number 110, the transformation system may execute the application for a legacy application. For example, the transformation system may compile and deploy the application with the legacy application to cause the legacy application to execute the application. In some implementations, the transformation system may execute the application, which may cause the transformation system to perform one or more of the functions described below in the connection with FIGS. 1B-1E. If the application is a plugin application (e.g., an add-on application that is installed on the legacy application), execution of the plugin application may enhance the capabilities of the legacy application. For example, execution of the plugin application may transform the legacy application into a low-code/no-code application capable of being managed by the low-code/no-code platform. In some implementations, the legacy application may include a legacy user interface application (e.g., a JavaScript object notation (JSON) application).

Figure 1B:
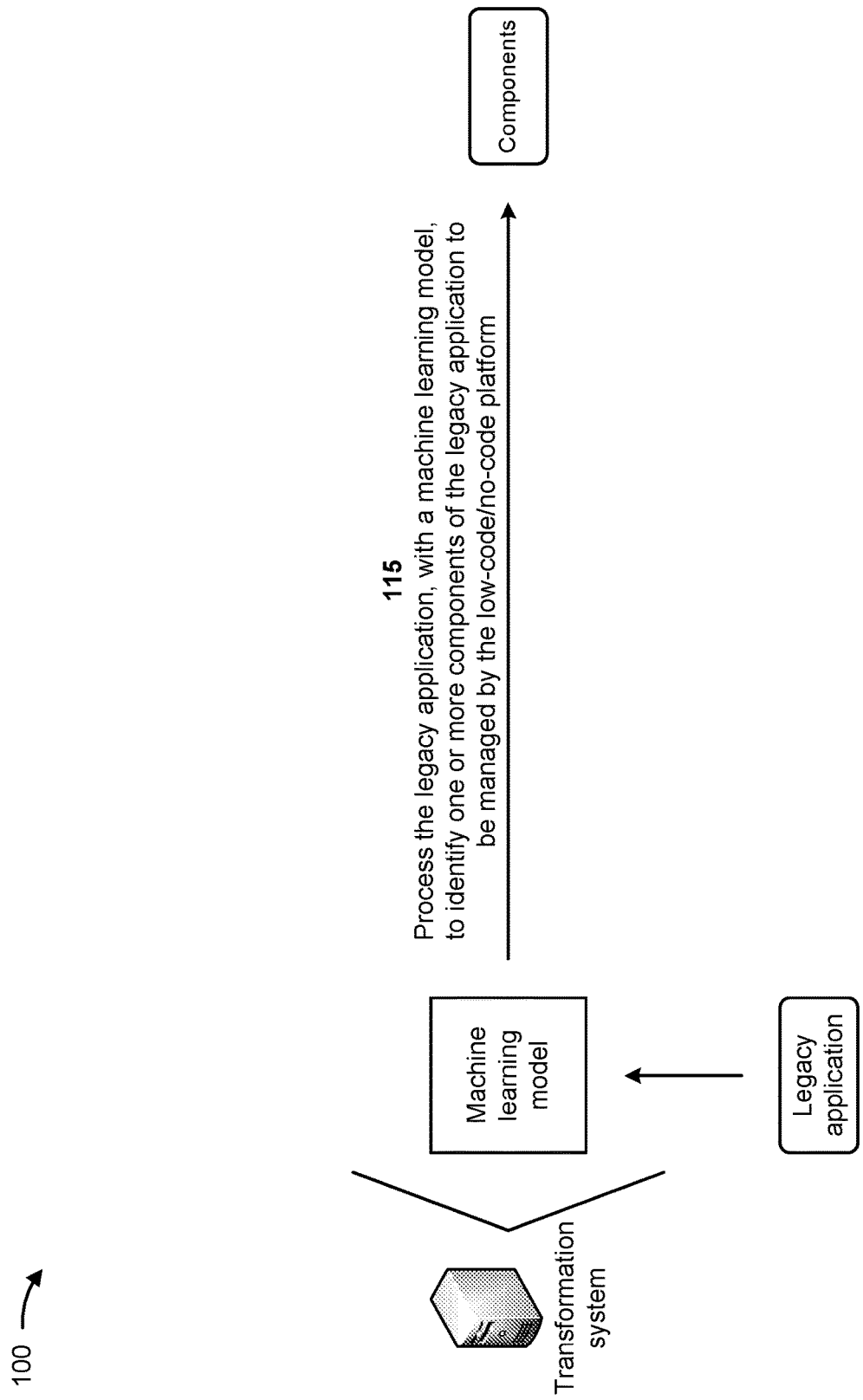

As shown in FIG. 1B, and by reference number 115, the transformation system may process the legacy application, with a machine learning model, to identify one or more components of the legacy application to be managed by the low-code/no-code platform. For example, the transformation system may train the machine learning model to identify one or more components of a legacy application to be managed by the low-code/no-code platform. In some implementations, rather than training the machine learning model, the transformation system may obtain the machine learning model from another system or device that trained the machine learning model. In this case, the transformation system may provide the other system or device with updated training, validation, and/or test datasets to retrain the machine learning model in order to update the machine learning model.

In some implementations, the machine learning model may include a clustering machine learning model, such as a k-means clustering model, a mean-shift clustering model, a density-based spatial clustering of application with noise (DBSCAN) model, an expectation-maximization (EM) clustering model, an agglomerative hierarchical clustering model, and/or the like. A clustering machine learning model may include a model that groups data points. Given a set of data points, a clustering machine learning model may classify each data point into a specific group or cluster. Data points provided in the same group may include similar properties and/or features, and data points provided in different groups may include highly dissimilar properties and/or features.

A k-means clustering model may utilize vector quantization to partition n observations into k clusters in which each observation belongs to a cluster with a nearest mean (e.g., a cluster center or a cluster centroid) serving as a prototype of the cluster. A mean-shift clustering model may include a sliding-window-based model that attempts to identify dense areas of data points. The mean-shift clustering model may include is a centroid-based model that locates center points of each group/class and updates candidates for center points based on a mean of the points within the sliding-window. A DBSCAN model may include a density-based clustering model that identifies clusters of non-spherical shape based on min data points a radius of a neighborhood (e.g., a group of data points that are close to each other). An EM clustering model may include a model that performs a maximum likelihood estimation in the presence of latent variables by estimating values for the latent variables, optimizing the model, and repeating these two steps until convergence. An agglomerative hierarchical clustering model may include a bottom-up model that treats each data point as a single cluster at the outset and successively merges (or agglomerates) pairs of clusters until all clusters have been merged into a single cluster that contains all the data points.

In some implementations, the transformation system may train the machine learning model with a training dataset to generate the trained machine learning model, and may process a validation dataset, with the trained machine learning model, to validate that the trained machine learning model is operating correctly. If the trained machine learning model is operating correctly, the transformation system may process the trained machine learning model, with a test dataset, to further ensure that the trained machine learning model is operating correctly. If the trained machine learning model is operating incorrectly, the transformation system may modify the trained machine learning model and may revalidate and/or retest the modified machine learning model based on the validation dataset and/or the test dataset. Further details of training the machine learning model are provided below in connection with FIG. 2.

In some implementations, when processing the legacy application, with the machine learning model, to identify the one or more components of the legacy application, the transformation system may determine dependencies in the legacy application. The transformation system may analyze the legacy application based on the dependencies and may identify folders of the legacy application based on analyzing the legacy application. The transformation system may identify files included in the folders of the legacy application, and may identify the one or more components (e.g., and component syntax) of the legacy application based on the files.

In some implementations, when processing the legacy application, with the machine learning model, to identify the one or more components of the legacy application, the transformation system may determine local storage of the legacy application based on the files included in the folders of the legacy application. The transformation system may determine hypertext transfer protocol (HTTP) calls of the legacy application based on the files, and may identify the one or more components of the legacy application based on the files.

Figure 1C:
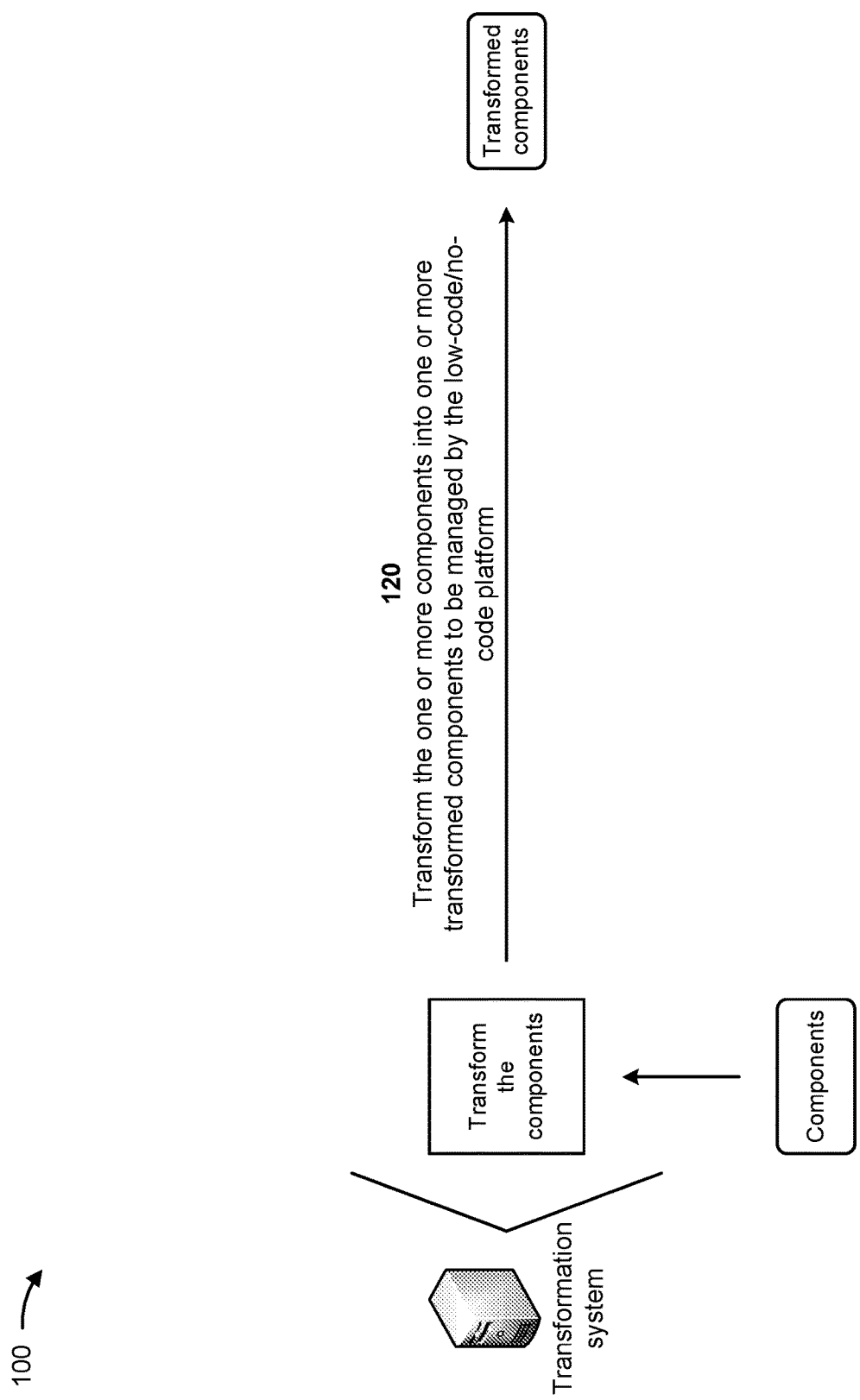

As shown in FIG. 1C, and by reference number 120, the transformation system may transform the one or more components into one or more transformed components to be managed by the low-code/no-code platform. For example, the transformation system may generate a widget pane pallet based on the one or more components of the legacy application. The widget pane pallet may enable a user to manipulate (e.g., drag and drop, modify, add, configure, and/or the like) the one or more components via the low-code/no-code platform. In some implementations, when transforming the one or more components into the one or more transformed components, the transformation system may create a pane for each of the one or more components (e.g., based on syntax of the one or more components) to generate one or more panes for the one or more components. In such implementations, the one or more panes may correspond to respective transformed components of the one or more transformed components.

In some implementations, when transforming the one or more components into the one or more transformed components, the transformation system may create a pane based on the one or more components of the legacy system. The transformation system may provide the one or more components in the pane to generate one or more widgets that correspond to the one or more transformed components. The one or more widgets may enable a user to manipulate (e.g., drag and drop, modify, add, configure, and/or the like) the one or more components via the low-code/no-code platform. In some implementations, the transformation system may generate a pane based on the one or more components, and may transform a component of the one or more components into a transformed component when the component is dragged and dropped in the pane.

Figure 1D:
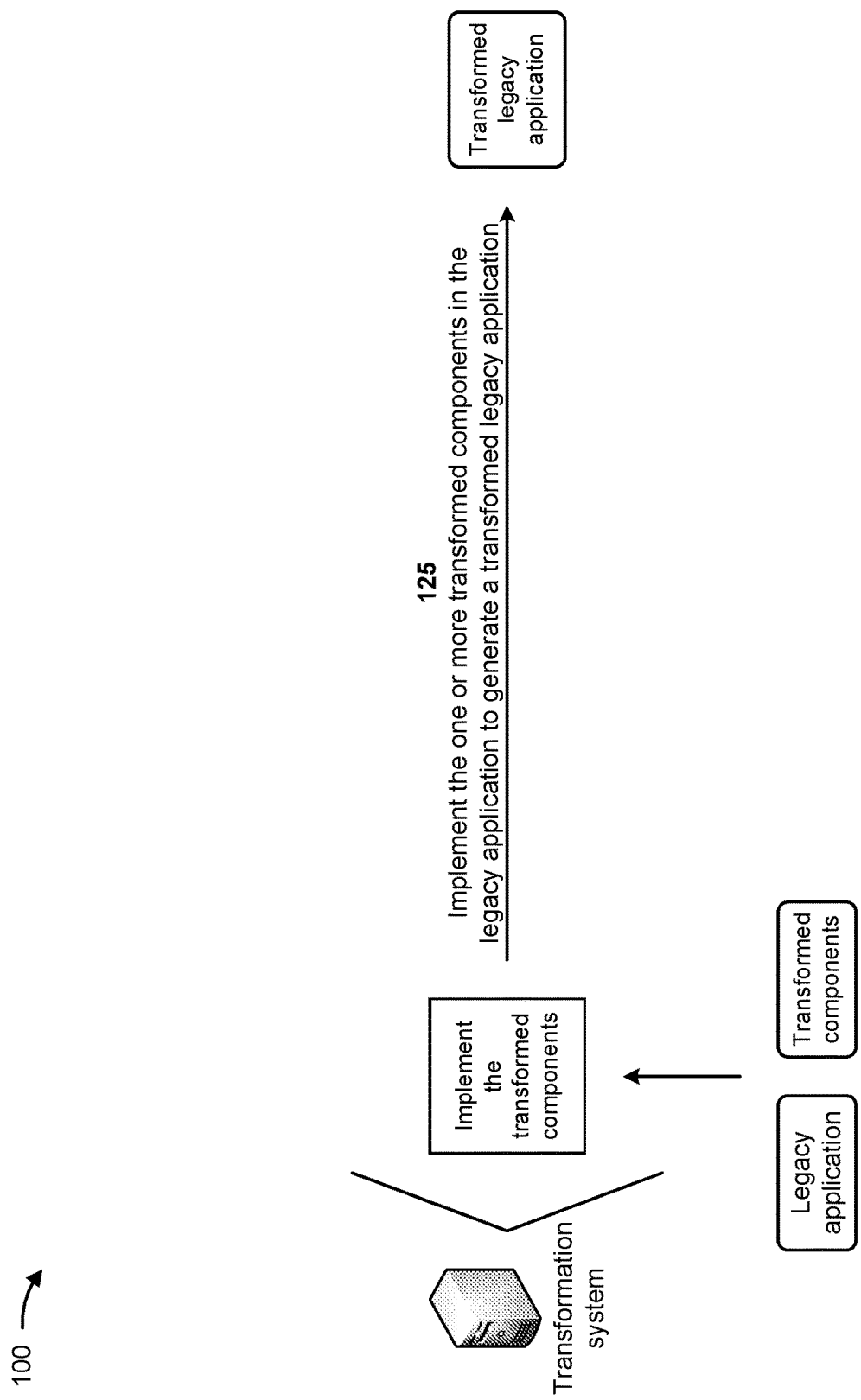

As shown in FIG. 1D, and by reference number 125, the transformation system may implement the one or more transformed components in the legacy application to generate a transformed legacy application. For example, the transformation system may replace the one or more components of the legacy application with corresponding ones of the one or more transformed components to generate the transformed legacy application. In some implementations, the transformation system may replace the one or more components of the legacy application with corresponding ones of the one or more panes to generate the transformed legacy application. Alternatively, or additionally, the transformation system may replace the one or more components of the legacy application with corresponding ones of the one or more widgets (e.g., provided in the pane) to generate the transformed legacy application.

Figure 1E:
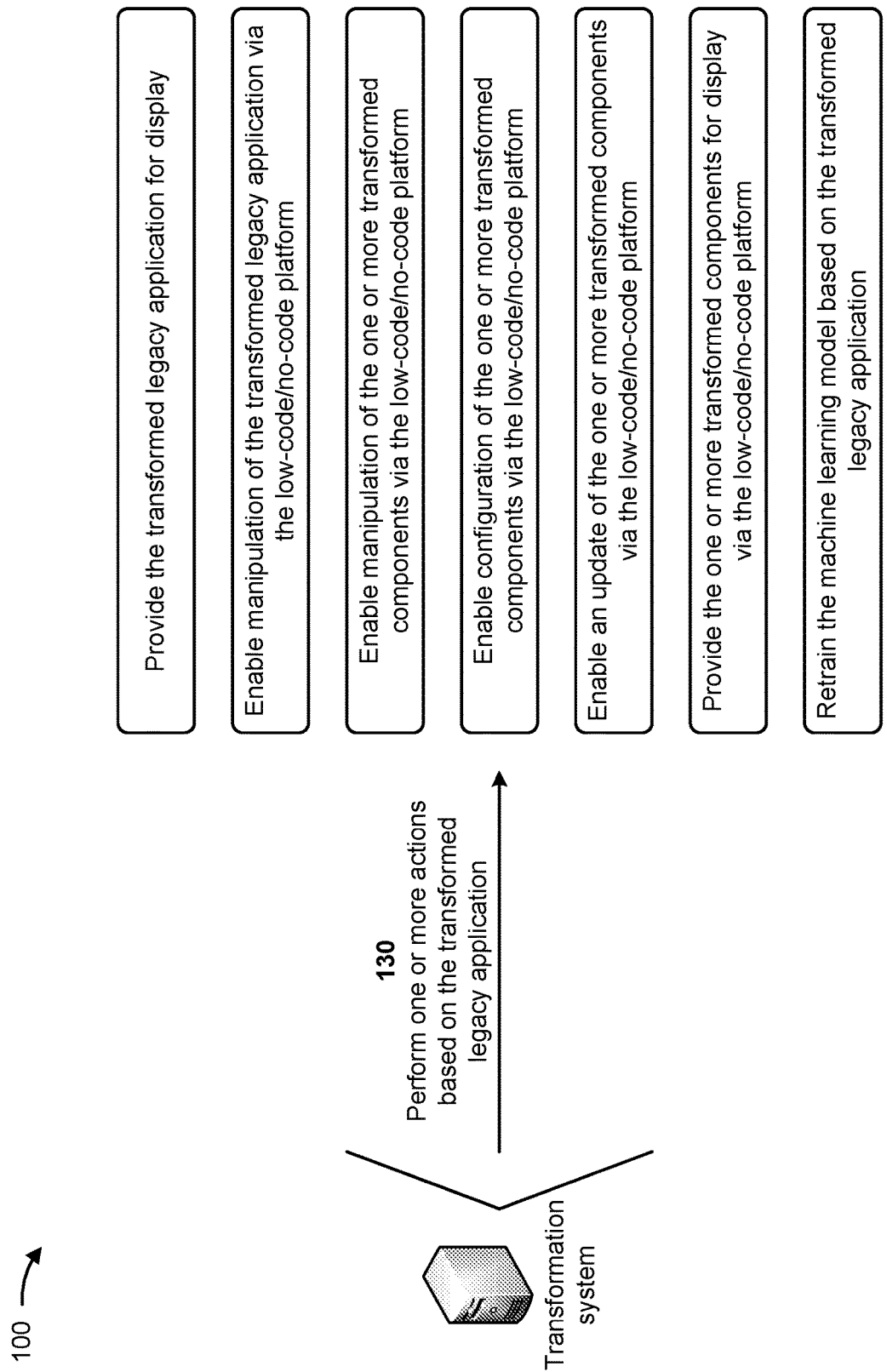

As shown in FIG. 1E, and by reference number 130, the transformation system may perform one or more actions based on the transformed legacy application. In some implementations, performing the one or more actions includes the transformation system providing the transformed legacy application for display. For example, the transformation system may provide the transformed legacy application to the user device, and the user device may display the transformed legacy application to a user of the user device. The user may then manage the transformed legacy application via the low-code/no-code platform. In this way, the transformation system conserves computing resources, networking resources, and/or the like that would otherwise have been consumed in utilizing developers to make simple changes to legacy applications.

In some implementations, performing the one or more actions includes the transformation system enabling manipulation of the transformed legacy application via the low-code/no-code platform. For example, the transformation system may provide, for display, the transformed legacy application to a user of the user device. The user (e.g., a non-developer) may utilize the user device to manipulate the transformed legacy application via the low-code/no-code platform. In this way, the transformation system conserves computing resources, networking resources, and/or the like that would otherwise have been consumed in scheduling developers to make changes to legacy applications.

In some implementations, performing the one or more actions includes the transformation system enabling manipulation of the one or more transformed components via the low-code/no-code platform. For example, the transformation system may provide, for display, the transformed legacy application to a user of the user device. The user (e.g., a non-developer) may utilize the user device to manipulate the one or more transformed components, of the transformed legacy application, via the low-code/no-code platform. In this way, the transformation system conserves computing resources, networking resources, and/or the like that would otherwise have been consumed in utilizing developers to make simple changes to legacy applications.

In some implementations, performing the one or more actions includes the transformation system enabling configuration of the one or more transformed components via the low-code/no-code platform. For example, the transformation system may provide, for display, the transformed legacy application to a user of the user device. The user (e.g., a non-developer) may utilize the user device to configure the one or more transformed components, of the transformed legacy application, via the low-code/no-code platform. The user may utilize the user device to implement the configured component in the transformed legacy application. In this way, the transformation system conserves computing resources, networking resources, and/or the like that would otherwise have been consumed in spending time and money on migration of legacy applications to a low-code/no-code platform.

In some implementations, performing the one or more actions includes the transformation system enabling an update of the one or more transformed components via the low-code/no-code platform. For example, the transformation system may provide, for display, the transformed legacy application to a user of the user device. The user (e.g., a non-developer) may utilize the user device to update one of the one or more transformed components, of the transformed legacy application, via the low-code/no-code platform. The user may utilize the user device to test and/or deploy the updated component in the transformed legacy application. In this way, the transformation system conserves computing resources, networking resources, and/or the like that would otherwise have been consumed in utilizing developers to make simple changes to legacy applications.

In some implementations, performing the one or more actions includes the transformation system providing the one or more transformed components for display via the low-code/no-code platform. For example, the transformation system may provide, for display, the one or more transformed components of the transformed legacy application to a user of the user device. The user (e.g., a non-developer) may utilize the user device to manipulate one of the one or more transformed components via the low-code/no-code platform. In this way, the transformation system conserves computing resources, networking resources, and/or the like that would otherwise have been consumed in scheduling developers to make changes to legacy applications.

In some implementations, performing the one or more actions includes the transformation system retraining the machine learning model based on the transformed legacy application. For example, the transformation system may utilize the transformed legacy application as additional training data for retraining the machine learning model, thereby increasing the quantity of training data available for training the machine learning model. Accordingly, the transformation system may conserve computing resources associated with identifying, obtaining, and/or generating historical data for training the machine learning model relative to other systems for identifying, obtaining, and/or generating historical data for training machine learning models.

In this way, the transformation system utilizes a machine learning model to transform a legacy application to a low-code/no-code application. The transformation system may utilize a module (e.g., a plugin application) that, when executed by the transformation system, transforms legacy applications into applications that may be managed by a low-code/no-code platform. Non-developer users may easily manipulate the transformed legacy applications, with migrating the legacy applications to a low-code/no-code platform. This, in turn, conserves computing resources, networking resources, and/or the like that would otherwise have been consumed in utilizing developers to make simple changes to legacy applications, spending time and money on migration of legacy applications to a low-code/no-code platform, scheduling developers to make changes to legacy applications, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
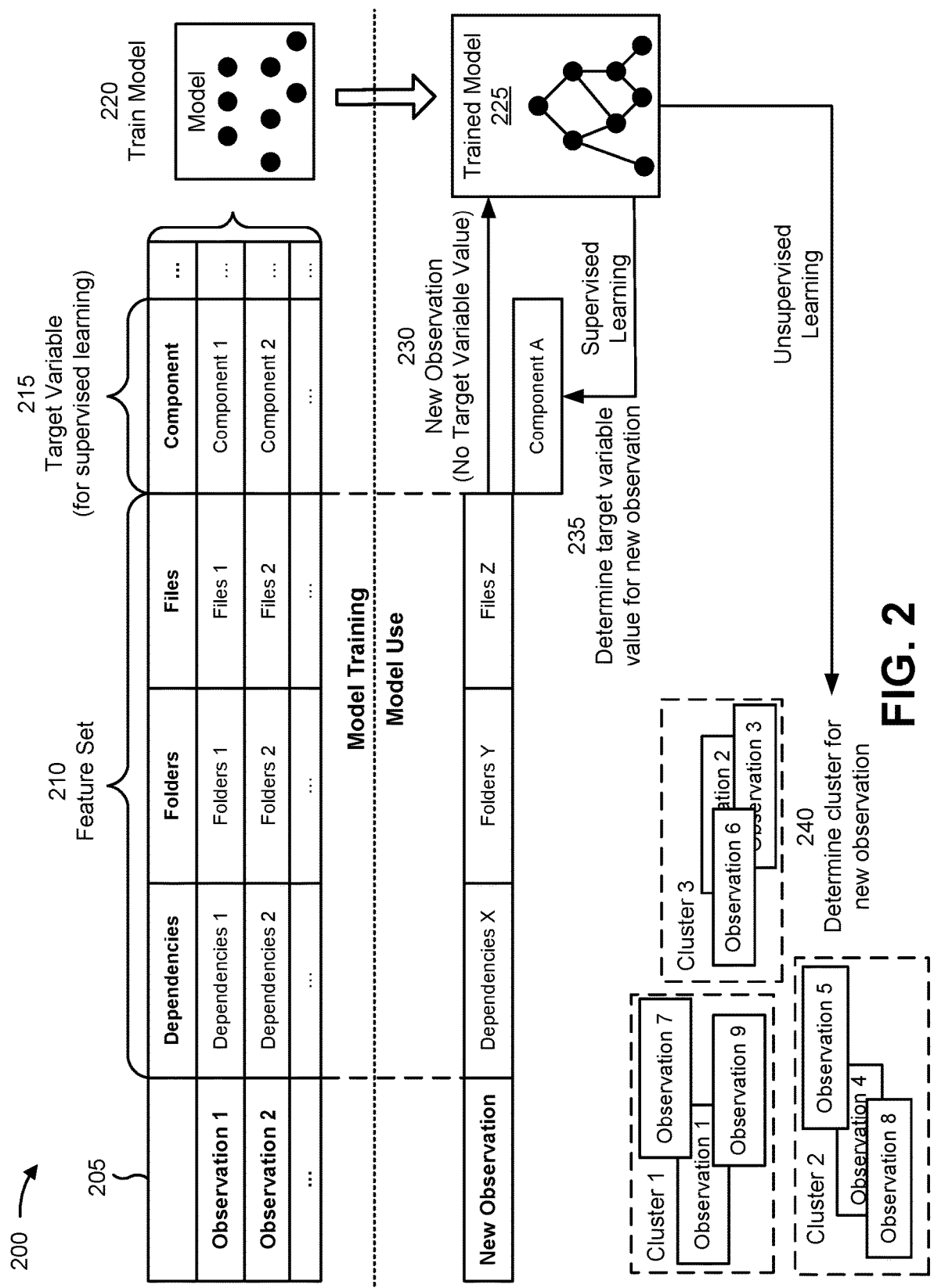
FIG. 2 is a diagram illustrating an example of training and using a machine learning model.

FIG. 2 is a diagram illustrating an example 200 of training and using a machine learning model for identifying components of a legacy application. The machine learning model training and usage described herein may be performed using a machine learning system. The machine learning system may include or may be included in a computing device, a server, a cloud computing environment, and/or the like, such as the transformation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the transformation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the transformation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of dependencies, a second feature of folders, a third feature of files, and so on. As shown, for a first observation, the first feature may have a value of dependencies 1, the second feature may have a value of folders 1, the third feature may have a value of files 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a component and may include a value of component 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of dependencies X, a second feature of folders Y, a third feature of files Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of component A for the target variable of the component for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a dependencies cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a folders cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify components of a legacy application. The machine learning system enables recognition and/or identification of tens, hundreds, thousands, or millions of features and/or feature values for tens, hundreds, thousands, or millions of observations, thereby increasing accuracy and consistency and reducing delay associated with identifying components of a legacy application relative to requiring computing resources to be allocated for tens, hundreds, or thousands of operators to manually identify components of a legacy application.

As indicated above, FIG. 2 is provided as an example. Other examples may differ from what is described in connection with FIG. 2.

Figure 3:
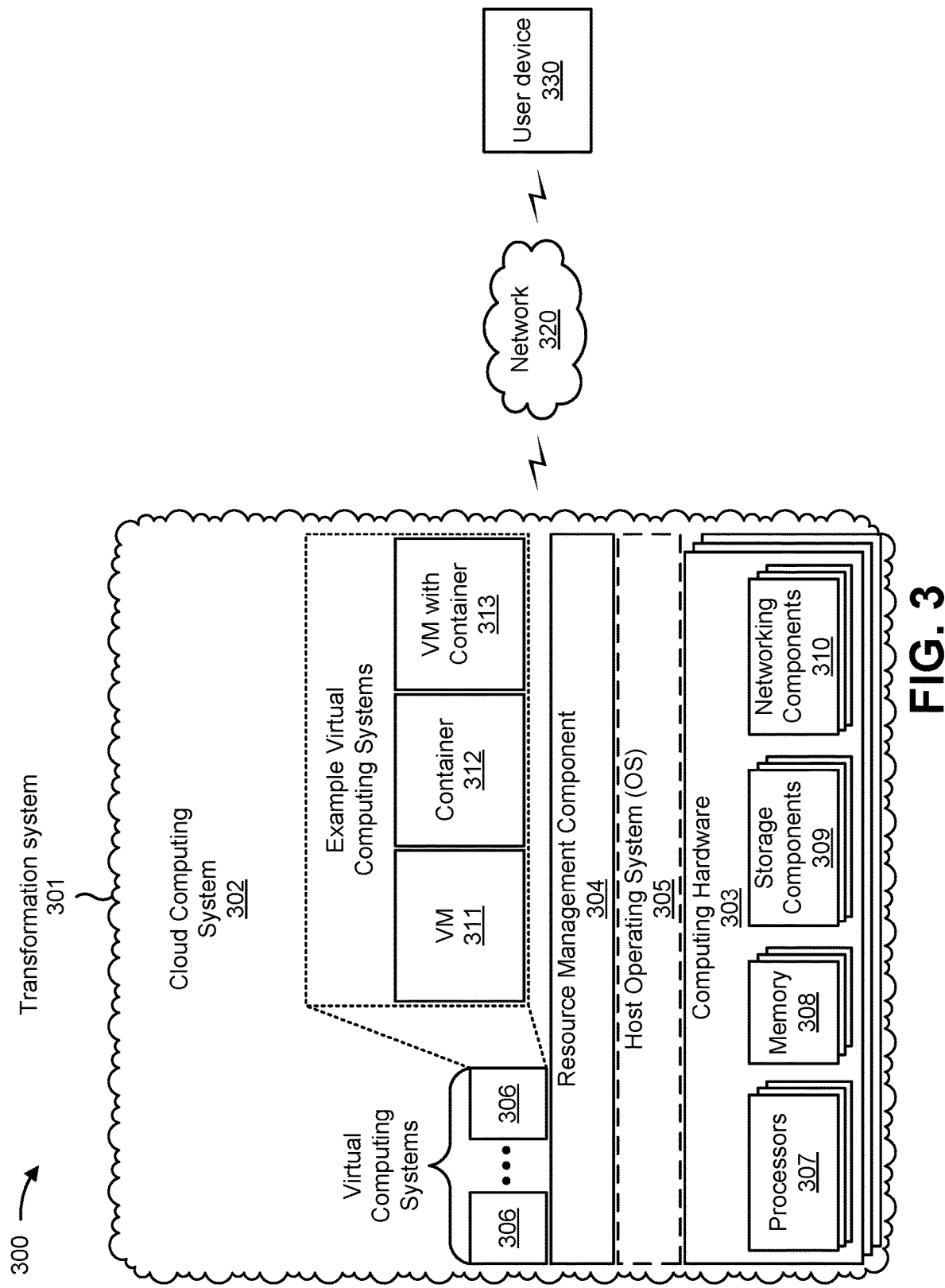
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a transformation system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the transformation system 301 may include one or more elements 303-313 of the cloud computing system 302, may execute within the cloud computing system 302, and/or may be hosted within the cloud computing system 302, in some implementations, the transformation system 301 may not be cloud-based (e.g., may be implemented outside of a cloud computing system) or may be partially cloud-based. For example, the transformation system 301 may include one or more devices that are not part of the cloud computing system 302, such as device 400 of FIG. 4, which may include a standalone server or another type of computing device. The transformation system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
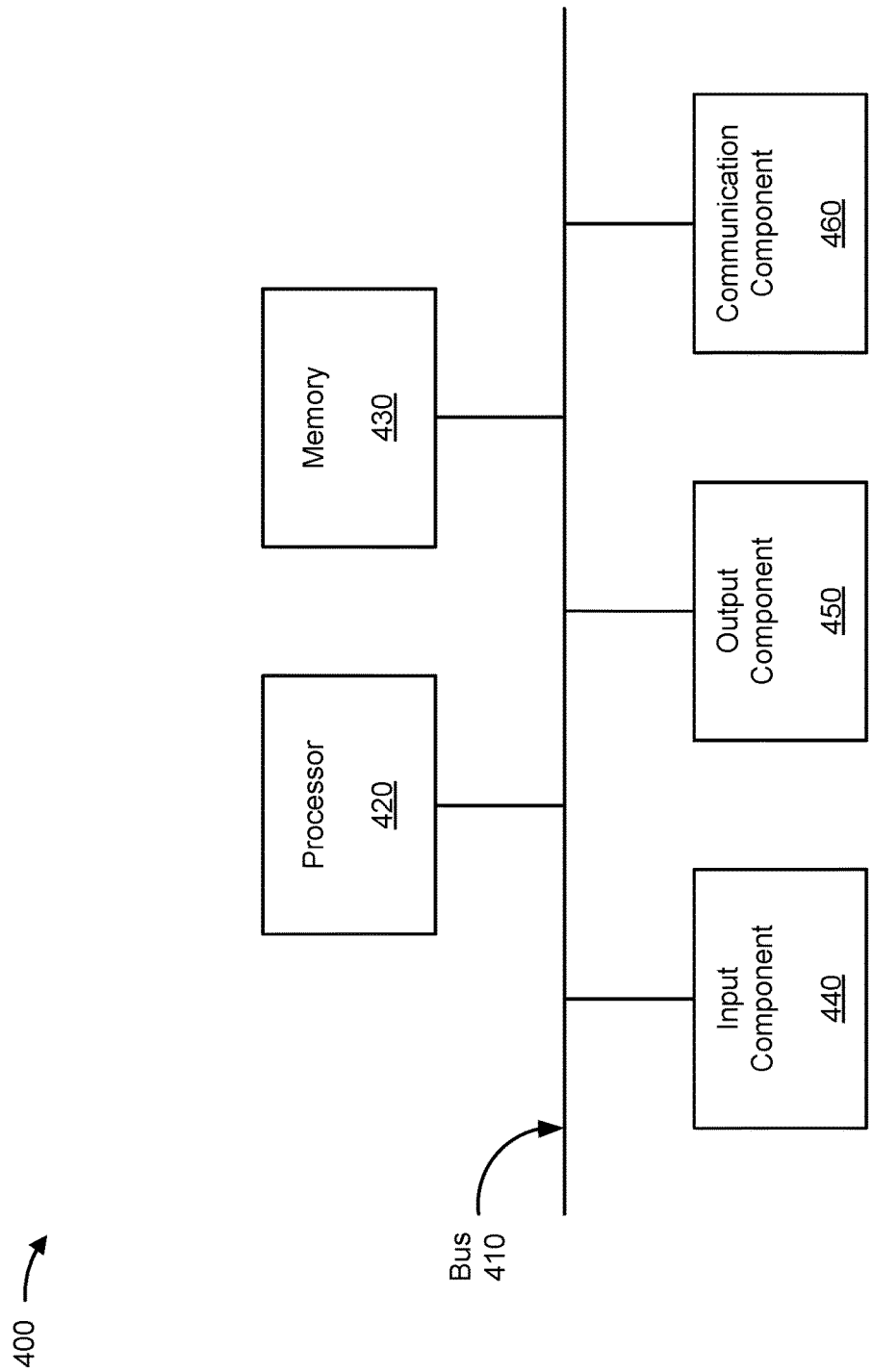
FIG. 4 is a diagram of example components of one or more devices of FIG. 3.

FIG. 4 is a diagram of example components of a device 400, which may correspond to the transformation system 301 and/or the user device 330. In some implementations, the transformation system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing a machine learning model to transform a legacy application to a low-code/no-code application. In some implementations, one or more process blocks of FIG. 5 may be performed by a device (e.g., the transformation system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an application for transforming legacy applications into low-code/no-code applications to be managed by a low-code/no-code platform (block 510). For example, the device may receive an application for transforming legacy applications into low-code/no-code applications to be managed by a low-code/no-code platform, as described above. In some implementations, the application is a plugin application for the legacy application.

As further shown in FIG. 5, process 500 may include executing the application for a legacy application of the legacy applications (block 520). For example, the device may execute the application for a legacy application of the legacy applications, as described above. In some implementations, the legacy application is a legacy user interface.

As further shown in FIG. 5, process 500 may include processing the legacy application, with a machine learning model, to identify one or more components of the legacy application to be managed by the low-code/no-code platform (block 530). For example, the device may process the legacy application, with a machine learning model, to identify one or more components of the legacy application to be managed by the low-code/no-code platform, as described above. In some implementations, processing the legacy application, with the machine learning model, to identify the one or more components of the legacy application includes determining dependencies in the legacy application, identifying folders of the legacy application based on the dependencies, identifying files included in the folders of the legacy application, and identifying the one or more components of the legacy application based on the files.

In some implementations, processing the legacy application, with the machine learning model, to identify the one or more components of the legacy application includes identifying files of the legacy application, determining local storage of the legacy application based on the files, determining hypertext transfer protocol calls of the legacy application based on the files, and identifying the one or more components of the legacy application based on the files.

As further shown in FIG. 5, process 500 may include transforming the one or more components into one or more transformed components to be managed by the low-code/no-code platform (block 540). For example, the device may transform the one or more components into one or more transformed components to be managed by the low-code/no-code platform, as described above. In some implementations, transforming the one or more components into the one or more transformed components includes creating a pane for each of the one or more components to generate one or more panes for the one or more components, wherein the one or more panes correspond to respective transformed components of the one or more transformed components. In some implementations, transforming the one or more components into the one or more transformed components includes creating a pane, and providing the one or more components in the pane to generate one or more widgets that correspond to the one or more transformed components.

As further shown in FIG. 5, process 500 may include implementing the one or more transformed components in the legacy application to generate a transformed legacy application (block 550). For example, the device may implement the one or more transformed components in the legacy application to generate a transformed legacy application, as described above. In some implementations, the transformed legacy application is to be managed by the low-code/no-code platform.

As further shown in FIG. 5, process 500 may include performing one or more actions based on the transformed legacy application (block 560). For example, the device may perform one or more actions based on the transformed legacy application, as described above. In some implementations, performing the one or more actions includes providing the transformed legacy application for display, or enabling manipulation of the transformed legacy application via the low-code/no-code platform. In some implementations, performing the one or more actions includes enabling manipulation of the one or more transformed components via the low-code/no-code platform, and modifying the transformed legacy application based on the manipulation of the one or more transformed components.

In some implementations, performing the one or more actions includes enabling configuration of the one or more transformed components via the low-code/no-code platform, and modifying the transformed legacy application based on the configuration of the one or more transformed components. In some implementations, performing the one or more actions includes enabling an update of the one or more transformed components via the low-code/no-code platform, and modifying the transformed legacy application based on the configuration of the one or more transformed components. In some implementations, performing the one or more actions includes providing the one or more transformed components for display via the low-code/no-code platform, or retraining the machine learning model based on the transformed legacy application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, an application for transforming legacy applications into low-code/no-code applications to be managed by a low-code/no-code platform;
executing, by the device, the application for a legacy application of the legacy applications;
processing, by the device, the legacy application, with a machine learning model, to identify one or more components of the legacy application to be managed by the low-code/no-code platform;
transforming, by the device, the one or more components into one or more transformed components to be managed by the low-code/no-code platform;
implementing, by the device, the one or more transformed components in the legacy application to generate a transformed legacy application; and
performing, by the device, one or more actions based on the transformed legacy application.

2. The method of claim 1, wherein the application is a plugin application for the legacy application.

3. The method of claim 1, wherein processing the legacy application, with the machine learning model, to identify the one or more components of the legacy application comprises:
determining dependencies in the legacy application;
identifying folders of the legacy application based on the dependencies;
identifying files included in the folders of the legacy application; and
identifying the one or more components of the legacy application based on the files.

4. The method of claim 1, wherein processing the legacy application, with the machine learning model, to identify the one or more components of the legacy application comprises:
identifying files of the legacy application;
determining local storage of the legacy application based on the files;
determining hypertext transfer protocol calls of the legacy application based on the files; and
identifying the one or more components of the legacy application based on the files.

5. The method of claim 1, wherein transforming the one or more components into the one or more transformed components comprises:
creating a pane for each of the one or more components to generate one or more panes for the one or more components,
wherein the one or more panes correspond to respective transformed components of the one or more transformed components.

6. The method of claim 1, wherein the legacy application is a legacy user interface.

7. The method of claim 1, wherein the transformed legacy application is to be managed by the low-code/no-code platform.

8. A device, comprising:
one or more memories; and
one or more processors, coupled to the one or more memories, configured to:
execute a plugin application for transforming legacy applications into low-code/no-code applications to be managed by a low-code/no-code platform;
process the legacy application, with a machine learning model, to identify one or more components of the legacy application to be managed by the low-code/no-code platform;
transform the one or more components into one or more transformed components to be managed by the low-code/no-code platform;
implement the one or more transformed components in the legacy application to generate a transformed legacy application; and
perform one or more actions based on the transformed legacy application.

9. The device of claim 8, wherein the one or more processors, to transform the one or more components into the one or more transformed components, are configured to:
create a pane; and
provide the one or more components in the pane to generate one or more widgets that correspond to the one or more transformed components.

10. The device of claim 8, wherein the one or more processors, to perform the one or more actions, are configured to one or more of:
provide the transformed legacy application for display; or
enable manipulation of the transformed legacy application via the low-code/no-code platform.

11. The device of claim 8, wherein the one or more processors, to perform the one or more actions, are configured to:
enable manipulation of the one or more transformed components via the low-code/no-code platform; and
modify the transformed legacy application based on the manipulation of the one or more transformed components.

12. The device of claim 8, wherein the one or more processors, to perform the one or more actions, are configured to:
enable configuration of the one or more transformed components via the low-code/no-code platform; and
modify the transformed legacy application based on the configuration of the one or more transformed components.

13. The device of claim 8, wherein the one or more processors, to perform the one or more actions, are configured to:
enable an update of the one or more transformed components via the low-code/no-code platform; and
modify the transformed legacy application based on the configuration of the one or more transformed components.

14. The device of claim 8, wherein the one or more processors, to perform the one or more actions, are configured to one or more of:
provide the one or more transformed components for display via the low-code/no-code platform; or
retrain the machine learning model based on the transformed legacy application.

15. A non-transitory computer-readable medium storing a set of instructions, the set of instructions comprising:
one or more instructions that, when executed by one or more processors of a device, cause the device to:
receive an application for transforming legacy applications into low-code/no-code applications to be managed by a low-code/no-code platform;
execute the application for a legacy application of the legacy applications;
process the legacy application, with a machine learning model and based on execution of the application, to identify one or more components of the legacy application to be managed by the low-code/no-code platform;
transform, based on execution of the application, the one or more components into one or more transformed components to be managed by the low-code/no-code platform;
implement, based on execution of the application, the one or more transformed components in the legacy application to generate a transformed legacy application; and
perform one or more actions based on the transformed legacy application.

16. The non-transitory computer-readable medium of claim 15, wherein the one or more instructions, that cause the device to process the legacy application, with the machine learning model, to identify the one or more components, cause the device to:
determine dependencies in the legacy application;
identify folders of the legacy application based on the dependencies;
identify files included in the folders of the legacy application; and
identify the one or more components of the legacy application based on the files.

17. The non-transitory computer-readable medium of claim 15, wherein the one or more instructions, that cause the device to process the legacy application, with the machine learning model, to identify the one or more components, cause the device to:
identify files of the legacy application;
determine local storage of the legacy application based on the files;
determine hypertext transfer protocol calls of the legacy application based on the files; and
identify the one or more components of the legacy application based on the files.

18. The non-transitory computer-readable medium of claim 15, wherein the one or more instructions, that cause the device to transform the one or more components into the one or more transformed components, cause the device to:
create a pane for each of the one or more components to generate one or more panes for the one or more components,
wherein the one or more panes correspond to respective transformed components of the one or more transformed components.

19. The non-transitory computer-readable medium of claim 15, wherein the one or more instructions, that cause the device to transform the one or more components into the one or more transformed components, cause the device to:
create a pane; and
provide the one or more components in the pane to generate one or more widgets that correspond to the one or more transformed components.

20. The non-transitory computer-readable medium of claim 15, wherein the one or more instructions, that cause the device to perform the one or more actions, cause the device to one or more of:
provide the transformed legacy application for display;
enable manipulation of the transformed legacy application via the low-code/no-code platform;
enable manipulation of the one or more transformed components via the low-code/no-code platform;
enable configuration of the one or more transformed components via the low-code/no-code platform;
enable an update of the one or more transformed components via the low-code/no-code platform;
provide the one or more transformed components for display via the low-code/no-code platform; or
retrain the machine learning model based on the transformed legacy application.

* * * * *